United States Patent [19]

Worschech et al.

[11] Patent Number: 4,962,145

[45] Date of Patent: Oct. 9, 1990

[54] PARTIAL ESTER RELEASE AGENTS FOR PLASTICS

[75] Inventors: Kurt Worschech, Loxstedt; Erwin Fleischer, Bremerhaven-Spaden; Peter Wedl, Bremerhaven; Frido Loeffelholz, Bremerhaven-Surheide; Ernst-Udo Brand, Bremerhaven, all of Fed. Rep. of Germany

[73] Assignee: Neynaber Chemie GmbH, Loxstedt, Fed. Rep. of Germany

[21] Appl. No.: 282,888

[22] Filed: Dec. 9, 1988

Related U.S. Application Data

[63] Continuation of Ser. No. 136,320, Dec. 22, 1987, abandoned.

[30] Foreign Application Priority Data

Dec. 22, 1986 [DE] Fed. Rep. of Germany ....... 3643968

[51] Int. Cl.$^5$ .................... C07C 69/33; C08K 5/10
[52] U.S. Cl. ........................ 524/310; 260/410.6; 260/410.7; 524/180; 524/181; 524/182; 524/308
[58] Field of Search ............... 524/308, 180, 181, 182, 524/310; 523/174; 260/410.6, 410.7; 560/263; 264/300; 106/9; 252/565

[56] References Cited

U.S. PATENT DOCUMENTS

| 3,600,186 | 8/1971 | Mattson et al. | 99/1 |
|---|---|---|---|
| 3,640,828 | 2/1972 | Brotz et al. | 252/565 |
| 3,691,219 | 9/1972 | Boussely | 260/410.7 |
| 3,988,330 | 10/1976 | Foulks et al. | 260/410.6 |
| 4,151,132 | 4/1979 | Khanna | 523/174 |
| 4,218,352 | 8/1980 | Takeuchi et al. | 524/310 |
| 4,421,886 | 12/1983 | Worschech et al. | 524/310 |
| 4,530,953 | 7/1985 | Yoshida | 524/318 |
| 4,548,964 | 7/1985 | Yoshida et al. | 524/311 |

FOREIGN PATENT DOCUMENTS 116453 12/1900 Fed. Rep. of Germany.
244786 3/1912 Fed. Rep. of Germany.

OTHER PUBLICATIONS

Richard Flemming et al; Chem. Abst. 64, 20017 (c) (1966).

Primary Examiner—Veronica P. Hoke
Attorney, Agent, or Firm—Ernest G. Szoke; Wayne C. Jaeschke; Henry E. Millson, Jr.

[57] ABSTRACT

Partial esters of saturated, linear $C_{22}$–$C_{34}$-monocarboxylic acids with polyols containing at least 3 carbon atoms and at least 2 hydroxyl groups are provided. The partial esters contain on average at least 1 free hydroxyl group and are generally obtained as mixtures of partial esters of at least 2 of said $C_{22}$–$C_{34}$-monocaroxylic acids. Particularly contemplated are partial esters based on montanic acids. The partial esters exhibit excellent release effects and transparency properties when used as release agents for plastics based on PVC or PVC copolymers.

14 Claims, No Drawings

PARTIAL ESTER RELEASE AGENTS FOR PLASTICS

This application is a continuation, of application Ser. No. 07/136,320, filed 12/22/87 now abandoned.

BACKGROUND OF THE INVENTION

1. Field of the Invention:

This invention relates to partial esters of saturated, linear $C_{22}$–$C_{34}$-monocarboxylic acids with polyols, to a process for their production and to their use as release agents for plastics, particularly those based on PVC or PVC copolymers. The invention also relates to molding compositions, especially compositions based on PVC or PVC copolymers, containing these partial esters.

For many years, full esters of saturated, linear $C_{22}$–$C_{34}$ monocarboxylic acids with polyols have played an important part in the processing of PVC and PVC copolymers, especially as release agents in calendering processes. They combine a good release effect with a relatively high PVC-compatibility, which is particularly pronounced in the case of high-impact or semi-rigid formulations. Conventional applications include the use of these full esters in the production of modified, glass-clear packaging films based on suspension or mass PVC and also the production of heat treated emulsion PVC films, for example for adhesive tape manufacture. In the latter case, the good compatibility of the full ester with PVC is particularly important because of the limit of the usable quantities can easily lie at 5 pbw. By contrast, a disadvantage of these known esters is the extremely low transparency limit in unmodified rigid PVC. Typically employed in these processes are full esters of ethylene glycol, 1,3-butanediol or glycerol with montanic acids of the type obtainable by conventional oxidative bleaching of montan waxes, or mixtures of predominantly saturated, linear $C_{22}$–$C_{34}$-carboxylic acids containing an even number of carbon atoms. The term "montanic acids" as used herein refers to the acids derived from montan waxes by any known process.

2. Discussion of Related Art:

Partial esters of $C_8$–$C_{22}$-fatty acids esterified with mono-and disaccharides, wherein each mono-or disaccharide unit contains at least four $C_8$–$C_{22}$-fatty acid residues are known; for example, such partial esters, used as low-calorie edible fats, are described in U.S. Pat. No. 3,600,186.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to partial esters of saturated, linear $C_{22}$–$C_{34}$-monocarboxylic acids with polyols which have an improved compatibility in unmodified PVC as compared to the corresponding full esters and, hence, can be used in greater quantities without affecting the transparency of the PVC. The partial esters of the invention also have an improved release effect, particularly in modified PVC where the slightly excessive solubility of the montan waxes normally used significantly reduces the release effect of the prior art full esters.

The invention, accordingly, provides partial esters of saturated, linear $C_{22}$–$C_{34}$-monocarboxylic acids with polyols containing at least 3 carbon atoms and at least 2 hydroxyl groups. The partial esters contain at least 1 free hydroxyl group and are present as mixtures of partial esters of at least two of the $C_{22}$–$C_{34}$-monocarboxylic acids. The montanic acids obtained from montan waxes as described supra are preferably used as the $C_{22}$–$C_{34}$-monocarboxylic acids for partial esterification. Preferably, the esters contain from 1 to 3 free hydroxyl groups.

In a preferred embodiment, the polyols contain from 3 to 10 carbon atoms and from 2 to 6 hydroxyl groups. Preferred polyols are based on saturated aliphatic hydrocarbons, including glycerol, diglycerol, polyglycerol, trimethylolpropane, ditrimethylolpropane, 1,4-butanediol, pentaerythritol, dipentaerythritol, neopentyl glycol, mannitol and sorbitol. Either a single polyol or mixtures of polyols can be used as the esterfying agent.

Preferred representatives of partial esters according to the invention are the partial montanic acid esters of glycerol, more especially glycerol mono-and di-montanate, and of diglycerol, more especially diglycerol sesquimontanate. Other preferred partial esters are partial montanic acid esters of pentaerythritol, especially pentaerythritol dimontanate; of neopentyl glycol, especiallyt neopentyl glycol monomontanate; and of 1,4-butanediol and of sorbitol, especially sorbitol trimontanate.

The present invention further provides a process for the production of partial esters of saturated, linear $C_{22}$–$C_{34}$-carboxylic acids characterized in that a saturated, linear $C_{22}$–$C_{34}$-monocarboxylic acid or a montanic acid with a polyol containing at least 3 carbon atoms and at least 2 hydroxyl groups is esterified in the presence of an acidic catalyst of the type used for esterification reactions, for example toluene sulfonic acid, and also metallic tin, tin(II)oxide, and acidic titanium compounds. The $C_{22}$–$C_{34}$-monocarboxylic acids are esterfied with the polyols in stoichiometric ratios corresponding to the desired partial esters. As well-known, these reactions typically do not exclusively yield the desired partial ester. Instead, a mixture predominantly containing the desired partial ester is typically obtained. If desired, the product can be purified by customary techniques. Additionally, it is also possible to prepare specific partial ester mixtures, for example sesquimontanates, in which statistically 1 mole of polyol reacts with 1.5 moles of montanic acid.

The present invention also relates to the use of one or more of the partial esters according to the invention as release agents for plastics, more especially plastics based on PVC or PVC copolymers. The partial esters according to the invention are added to the plastics, optionally together with other typical known additives and stabilizers for PVC molding compositions, especially Sn containing stabilizers, such as octyltin mercaptide. Molding compositions according to the invention based on PVC or PVC copolymers typically contain from 0.01 to 5.0% by weight of the partial esters and may further include in addition to the vinylchloride homo- or copolymers and partial esters, modifying additives such as high-impact modifiers, especially methacrylate/butadiene/styrene high-impact modifiers or flow modifiers.

The invention is illustrated but not limited by the following Examples:

EXAMPLES

A. Preparation of partial esters according to the invention

EXAMPLE 1

Glycerol dimontanate

A three-necked flask equipped with a stirrer, thermometer and descending Liebig condenser was charged with 19 g glycerol (0.207 mole), 165 g montanic acid (0.413 mole; Hoechst-Wachs S) and 0.4 g tin powder. The mixture was heated with stirring to 210° C. with application of a gentle vacuum which was increased to 20 mbar over a period of 1.5 h. Thereafter, the acid value had fallen to approximately 1. The mixture was cooled to 100° C., bleached and filtered. A pale yellow hard wax having a dropping point of 79° C. was obtained.

EXAMPLE 2

Glycerol monomontanate 400 g montanic acid (Hoechst-Wachs S), 97 g glycerol (5% excess) and 0.5 g tin powder were reacted as in Example 1. A yellow, brown-tinged hard wax having a dropping point of 84.2° C. was obtained.

EXAMPLE 3

Diglycerol sesquimontanate 112 g diglycerol (0.67 mole), 400 g montanic acid (1.0 mole) and 0.4 g tin powder were heated to 200° C. as in Example 1 with application of a gentle vacuum. The vacuum was increased to 24 mbar over a period of 3.4 h. The product had an acid value of approximately 1. A brown colored hard wax having a dropping point of 81° C. was obtained after cooling to 100° C., bleaching and filtering.

EXAMPLE 4

Pentaerythritol dimontanate 28.1 g pentaerythritol (0.207 mole), 165 g montanic acid (0.413 mole) and 0.4 g tin powder were heated as in Example 1 to 200° C. with application of a gentle vacuum. The vacuum was increased to 20 mbar over a period of 2 h. The product had an acid value of approximately 1. A yellow, brown-tinged hard wax having a dropping point of 79° C. was obtained after cooling to 100° C., bleaching and filtering.

EXAMPLE 5

Neopentyl glycol monomontanate 64.2 g neopentyl glycol (0.617 mole), 246.9 g montanic acid (0.617 mole) and 0.4 g tin powder were heated to 210° C. as in Example 1 with application of a gentle vacuum. The vacuum was increased to 150 mbar over a period of 5 h. The product had an acid number of approximately 2. A brown-yellow hard wax having a dropping point of 72° C. was obtained after cooling to 100° C., bleaching and filtering.

EXAMPLE 6

1,4-butanediol monomontanate 57.2 g 1,4-butanediol (0.636 mole), 254.2 g montanic acid and 0.4 g tin powder were heated to 210° C. as in Example 1 with application of a gentle vacuum. The vacuum was increased to 152 mbar over a period of 3 hours. The mixture had an acid value of 1.5. A brownish-yellow wax having a dropping point of 77° C. was obtained after cooling to 100° C., bleaching and filtering.

EXAMPLE 7

Sorbitol trimontanate 41.1 g sorbitol (0.226 mole), 271.1 g montanic acid (0.678 mole) and 0.4 g tin powder were heated to 200° C. as in Example 1 with application of a gentle vacuum. The vacuum was increased to 15 mbar over a period of 14 h, by which time the acid value had fallen to 5. After cooling to 100° C., the product was filtered, giving a brown hard wax having a dropping point of 78° C.

B. PVC molding compositions according to the invention and prior art

1. Methods

Tests demonstrating the effectiveness of the partial esters according to the invention in a modified PVC formulation (Formulation I) and an unmodified PVC formulation (Formulation II) were performed as follows:

a. Tack-Free Time Test & Color Stability Test

To determine the tack-free time, the molding compositions (sample weight 220 g) were processed on a laboratory roll mill (Berstorff roll mill 450×220 mm) of which the rolls had a bowl width of 250 mm and a bowl diameter of 220 mm, at a roll temperature of 200° C. and at a roll speed of 12.5 r.p.m. (rolls rotating in the same direction) with regular turning of the test sheet formed until the molding composition adhered firmly to the rolls. At the same time, the early color stability was observed by regular sampling and visual assessment of the samples. In addition, the maximum roll nip load occurring was electronically recorded. Tack-free time values, early color stability values, and roll nip load test results are presented in TABLES I, II and III.

b. Transparency Test

To test transparency, 4 mm thick plates were compression-molded from the PVC molding compositions obtained and their transparency determined in percent against air as the reference standard. A transparency meter of the type made by Dr. Bruno Lange GmbH, Neuss, was used for the measurements which were performed by the absorption method. Transparency Test results are presented in Tables I, II and III.

c. Plasticizing Behavior

The plasticizing behavior of the molding compositions was tested by means of a plastograph (Brabender PL 151 Plasticorder; see P. Klenk, "Der Plastverarbeiter", Vol. 21, 1970/7, pages 642 to 644). The chamber temperature was 165° C. and the rotational speed 40 r.p.m. The tests were each carried out on 34 g of molding composition.

The plasticizing time of each molding composition, the maximum kneading resistance, the kneading resistance 15 minutes after reaching the maximum and the mass temperature 15 minutes after reaching the maximum are shown in Table II.

d. Static Thermal Stability Test

The stabilizing effect of montan wax and the partial esters according to the invention was tested using the "static thermal stability" of rolled sheets. To this end, the molding compositions were rolled for 5 minutes to form test sheets on a laboratory roll mill measuring 450×220 mm (Berstorff) at a roll temperature of 170° C. and at a roll speed of 12.5 r.p.m. (rolls rotating in the same direction). The approximately 0.5 mm thick sheets were cut into square test specimens having an edge length of 10 mm which were then exposed to a temperature of 180° C. in a drying cabinet with rotating shelves (Heraeus FT 420 R). Samples were taken at 10 minute intervals and examined for discoloration. The results or "Static Thermal Stability Value" is expressed as the period of time after which the first signs of discoloration of the samples were noticed. The period of time after which the test was terminated due to excessive discoloration (end of stability) is also given. Static Thermal Stability Test data are presented in Table III.

2. Materials a. Modified Molding Compositions

| pbw | Ingredient |
| --- | --- |
| | Formulation I |
| 100 | S-PVC, K-Value 60 |
| 6 | MBS Modifier |
| 1.5 | flow modifier |
| 1.5 | octyl tin mercaptide |
| 1.0 | glycerol dioleate |
| | Formulation Ia |
| 100 | S-PVC, K-Value 60 |
| 10 | MBS Modifier |
| 1 | flow modifier |
| 1.5 | octyl tin mercaptide |
| 1 | glycerol dioleate | b. Unmodified Molding Compositions

| | Formulation II |
| --- | --- |
| pbw | Ingredient |
| 100 | S-PVC, K-Value 60 |
| 1.5 | octyl tin mercaptide |
| 1.0 | glycerol dioleate | b. The MBS modifiers used in formulations I and Ia are commercially available high-impact modifiers based on methacrylate-butadiene-styrene copolymers. The flow modifiers used in the same formulations are commercially available preparations based on methacrylates.

c. Unless otherwise stated, all quantities are expressed in parts by weight (pbw).

d. The montan wax employed in the comparisons ("Procedures" infra) is Hoechst-Wachs E TM, commercially available from Hoechst, Federal Republic of Germany.

3. Procedures

Each of the molding compositions I, Ia and II, described under "Materials" was modified with either a montan wax according to the prior art or a partial ester of the invention according to one of Examples 1-7, supra. Two products were compared according to the Tests described under "Materials", as set forth in Tables I, II, III, with the quantities of modifying agent given as parts by weight.

TABLE 1

A. Color Stability/Tack-Free Time/Roll Nip Load

| | Initial Color | Early color stability | Tack-free time | Roll nip load (KN) |
| --- | --- | --- | --- | --- |
| Formulation I | | | | |
| 0.3 Montan wax | colorless | 12' | 14' | 40.7 |
| 0.3 Sorbitan trimontanate | colorless | 12' | 18' | 40.0 |
| 0.5 Montan wax | colorless | 14' | 18' | 41.0 |
| 0.5 Sorbitol trimontanate | colorless | 12' | 30' | 39.7 |
| Formulation II | | | | |
| 0.3 Montan Wax | colorless | 14' | 16' | 39.1 |
| 0.3 Sorbitol trimontanate | colorless | 14' | 30' | 37.4 |
| 0.5 Montan wax | colorless | 16' | 24' | 37.2 |
| 0.5 Sorbitol trimontanate | colorless | 16' | 30' | 37.1 |

B. Transparency
Transparency of 4 mm-thick molded plates (permeability to light)

| Additive | Formulation I | | Formulation II | |
| --- | --- | --- | --- | --- |
| | 0.3 pbw | 0.5 pbw | 0.3 pbw | 0.5 pbw |
| Montan wax | 64% | 12% | 65% | 61% |
| Sorbitol trimontanate | 74% | 73% | 63% | 60% |

TABLE II

A. Color Stability/Tack-Free Tack-Free Time/Roll Nip Load

| | Initial color | Early color stability | Tack free time | Roll nip load (KN) |
| --- | --- | --- | --- | --- |
| Formulation Ia+ | | | | |
| 0.3 Montan wax | colorless | — | 4' | — |
| 0.3 Glycerol monomontanate | colorless | — | 4' | — |
| 0.3 Glycerol dimontanate | colorless | 8' | 8' | — |
| 0.3 Diglycerol sesqui-montanate | colorless | 8' | 8' | — |
| 0.5 Montan wax | colorless | 8' | 8' | — |
| 0.5 Glycerol monomontanate | colorless | — | 4' | — |
| 0.5 Glycerol dimontanate | colorless | 12' | 14' | — |
| 0.5 Diglycerol sesqui-montanate | colorless | 10' | 10' | — |
| Fomulation II+ | | | | |
| 0.3 Montan wax | colorless | 16' | 18' | 43.7 |
| 0.3 Glycerol monomontanate | colorless | 14' | 16' | 44.3 |

TABLE II-continued

| | | | | | |
|---|---|---|---|---|---|
| 0.3 Glycerol | colorless | 18' | 28' | 42.2 | |
| 0.3 Diglycerol sesquimontanate | colorless | 14' | 16' | 43.2 | |
| 0.5 Montan wax | colorless | 14' | 26' | 43.0 | |
| 0.5 Glycerol monomontanate | colorless | 14' | 24' | 43.2 | |
| 0.5 Glycerol dimontanate | colorless | 18' | 32' | 41.0 | |
| 0.5 Diglycerol sesquimontanate | colorless | 14' | 18' | 42.3 | |

B. Plastograph Tests: II T = 165° C.; n = 40 r.p.m.; Sw = 34 g

| | Plasticizing time in mins | Kneading resistance max. | Nm° sec.$^{-1}$ 15' after max. | Mass temp °C. 15' after max |
|---|---|---|---|---|
| 1.0 Montan wax | 5.0 | 19.5 | 17.2 | 167.4 |
| 1.0 Glycerol monomontanate | 3.6 | 21.0 | 17.0 | 167.4 |
| 1.0 Glycerol dimontanate | 15.4 | 18.0 | 17.5 | 168.8 |
| 1.0 Diglycerol sesquimontanate | 3.9 | 21.0 | 17.3 | 167.0 |

C. Transparency
Transparency of 4 mm molded plates:

| Additive | Formulation Ia 0.5 bpw | Formulation II 0.5 bpw |
|---|---|---|
| Montan wax | 61% | 6% |
| Glycerol monomontanate | 64% | 63% |
| Glycerol dimontanate | 60% | 40% |
| Diglycerol sesquimontanate | 64% | 69% |

TABLE III

A. Color Stability/Tack-Free Time/Roll Nip Load

| Formulation Ia+ | Initial color | Early color stability | Tack free time | Roll nip load (KN) |
|---|---|---|---|---|
| 0.5 Montan wax | colorless | — | 4' | 46.8 |
| 0.5 Glycerol monomontanate | colorless | — | 4' | 47.0 |
| 0.5 Glycerol dimontanate | colorless | 14' | 14' | 47.0 |

B. Transparency
Transparency of 4 mm plates:

| Fomulation Ia+ | Permeability to light |
|---|---|
| 0.5 Montan wax | 66% |
| 0.5 Glycerol monomontanate | 69% |
| 0.5 Glycerol dimontanate | 65% |

C. Static Thermal Stability
Detemination cf static thermal stability on rolled sheets in a drying cabinet with rotating shelves (Heraeus) at 180° C.

Stability tests:

| Fomulation II+ | Initial color | Early color stability slight clear | | End of stability |
|---|---|---|---|---|
| 0.5 Montan wax | colorless | 45' | 75' | 105' |
| 0.5 Glycerol monomontanate | colorless | 60' | 90' | 120' |
| 0.5 Glycerol dimontanate | colorless | 60' | 75'–90 | 105' |

3. Results

As can be seen from the Tables, the partial ester of Example 2 (glycerol monomontanate) develops virtually the same release effect as a commercially available montan wax both in modified and in unmodified PVC batches, but in transparency measurements clearly surpasses the commercially available product in modified PVC and by far surpasses the prior art in pure rigid PVC. In addition, this partial ester according to the invention shows enhanced activity in conjunction with the Sn stabilizers; long-time stability is improved by about 10% both in modified and in unmodified PVC. Commercially available montan waxes do not show this effect and behave indifferently in this regard.

The partial ester of Example 3 (diglycerol sesquimontanate) produces a considerable increase over the commercially available product in parting performance in modified rigid PVC formulations and also surpasses the commercially available product with respect to transparency. In pure rigid PVC, this compound according to the invention achieves transparency values which were previously unattainable with any commercial product, including those outside the class of montan waxes.

The partial ester of Example 1 (glycerol dimontanate) is particularly contemplated as it achieves by far the best release values of all the montan waxes tested, irrespective of the use of modifying agents in the formulation. In the Brabender tests as well, the diester shows a strong lubricating effect and distinctly reduces kneading resistance at the maximum of the torque curve. The high transparency values, especially in modified formulations, are surprising for such a highly effective product.

In all the modified and unmodified PVC formulations tested, the partial ester of Example 7 (sorbitan trimontanate) produces an improved tack-free time for substantially the same early color stability and, in unmodified PVC, an improvement, in some cases a considerable improvement, in transparency.

The partial esters according to the invention could not have been expected to increase release performance. The fact that an enhanced effect is also often obtainable in conjunction with sulfur-containing Sn-stabilizers is another advantage of the partial esters according to the invention.

We claim:

1. A partial ester containing on average at least 1 free hydroxyl group which is an ester of at least one saturated, linear $C_{22}$–$C_{34}$ montanic acid esterified with diglycerol.

2. A mixture of partial esters according to claim 1 based on at least two different $C_{22}$–$C_{34}$-montanic acids.

3. Diglycerol sesquimontanate.

4. Glycerol monomontanate.

5. A molding composition comprising a vinyl chloride homo- or co-polymer and a release agent consisting essentially of a partial ester containing on average at least 1 free hydroxyl group which is an ester of at least one saturated, linear $C_{22}$–$C_{34}$-montanic acid esterified with glycerol or diglycerol in an amount sufficient to promote release of the composition from a mold.

6. The molding composition of claim 5, wherein the partial ester is present in an amount of from about 0.01 to about 5.0% by weight of the composition.

7. The molding composition of claim 5, further including an Sn-based stabilizer.

8. The molding composition of claim 7, wherein the partial ester is glycerol monomontanate.

9. A molding composition comprising a vinyl chloride homo- or co-polymer and a release agent consisting essentially of a mixture of partial esters containing on average at least 1 free hydroxyl group and wherein the ester mixture contains esters of at least two different saturated, linear $C_{22}$–$C_{34}$-montanic acids esterified with glycerol or diglycerol in an amount sufficient to promote release of the composition from a mold.

10. The molding composition of claim 9, wherein the partial ester is present in an amount of from about 0.01 to about 5.0% by weight of the composition.

11. The molding composition of claim 10, wherein the partial ester is present in an amount of about 5.0% by weight.

12. The molding composition of claim 9, further including an Sn-based stabilizer.

13. In a process for modifying a vinyl chloride-based molding composition to promote release of the composition from a molding surface wherein a release agent is incorporated into the composition in an amount sufficient to promote said release, the improvement comprising incorporating into the composition as release agent a partial ester containing on average at least 1 free hydroxyl group which is an ester of at least one saturated linear $C_{22}$–$C_{34}$ montanic acid esterified with glycerol or diglycerol.

14. A process for the production of a mixture of partial esters containing on average at least 1 free hydroxyl group which are based on at least two different $C_{22}$–$C_{34}$ montanic acids esterified with glycerol or diglycerol comprising esterifying the $C_{22}$–$C_{24}$-montanic acids with glycerol or diglycerol in the presence of a catalyst.

* * * * *